(12) United States Patent
Ito et al.

(10) Patent No.: US 6,707,261 B2
(45) Date of Patent: Mar. 16, 2004

(54) DISCHARGE LAMP LIGHTING CIRCUIT

(75) Inventors: Masayasu Ito, Shizuoka (JP); Shinji Ohta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/379,487

(22) Filed: Mar. 4, 2003

(65) Prior Publication Data

US 2003/0169000 A1 Sep. 11, 2003

(30) Foreign Application Priority Data

Mar. 6, 2002 (JP) .................................... P. 2002-059902

(51) Int. Cl.[7] .............................................. H05B 37/00
(52) U.S. Cl. .................. 315/224; 315/DIG. 5; 315/DIG. 7
(58) Field of Search ..................... 315/224, DIG. 7, 315/DIG. 5, 226

(56) References Cited

U.S. PATENT DOCUMENTS

| | | | |
|---|---|---|---|
| 6,034,487 A | 3/2000 | Yamashita et al. | 315/244 |
| 6,181,084 B1 * | 1/2001 | Lau | 315/291 |

* cited by examiner

*Primary Examiner*—D. Vu
(74) *Attorney, Agent, or Firm*—Fish & Richardson P.C.

(57) ABSTRACT

In a discharge lamp lighting circuit having a DC-AC converter circuit, a circuit for generating a driving voltage for the DC-AC converter circuit is simplified and cost and power losses are reduced. A discharge lamp lighting circuit 1 has a DC-DC converter circuit 3 for converting an input voltage from a DC power source 2 to a required DC voltage, a DC-AC converter circuit 4 disposed down-circuit of the DC-DC converter circuit and having a bridge-type construction using a plurality of switching devices, and a control circuit 7 for performing lighting control of a discharge lamp 6. A voltage generated from a power supply voltage to the control circuit 7 by a driving voltage generating part 9B is supplied as the driving voltage of the DC-AC converter circuit 4.

4 Claims, 4 Drawing Sheets

DISCHARGE LAMP LIGHTING CIRCUIT

BACKGROUND OF THE INVENTION

This invention relates to technology for generating a voltage for driving a DC-AC converter circuit in a discharge lamp lighting circuit.

A known construction of a lighting circuit for a discharge lamp such as a metal halide lamp has a DC power source, a DC-DC converter circuit, a DC-AC converter circuit and a starting circuit; the voltage and current of the discharge lamp are detected, and a control circuit is necessary for performing power control of the discharge lamp on the basis of corresponding detection signals.

If there is no fluctuation of the voltage from the DC power source, and power is supplied to the circuit at-the expected voltage value at all times, there is no problem; however, in practice it is necessary to stabilize the supplied voltage to remove voltage fluctuations.

Accordingly, methods such as generating a predetermined power supply voltage by raising or lowering the DC input voltage from the DC power source and supplying this to the control circuit and supplying it to a driving circuit (a driver IC or the like) of semiconductor switching devices constituting the DC-AC converter circuit have been employed. For example, when the DC input voltage from the DC power source has fallen, to keep the DC-AC converter circuit operating properly in order to maintain the lighting of the discharge lamp, it is necessary for this DC input voltage to be raised, and for this a stabilized power supply circuit using a transformer and switching devices and a drive control circuit thereof and a rectifying and smoothing circuit with diodes and capacitors has been provided so that the necessary voltage is obtained.

However, when the construction of the power supply circuit for obtaining the voltage for driving the DC-AC converter circuit becomes complex, the number of components constituting the power supply circuit increases, and there are consequent problems of increased cost and difficulty in achieving reductions in size and power consumption.

SUMMARY OF THE INVENTION

It is therefore an object of the present invention, in a discharge lamp lighting circuit having a DC-AC converter circuit, to simplify a circuit for generating the voltage for driving the DC-AC converter circuit and to reduce the cost and the power loss of the discharge lamp lighting circuit.

To achieve the above object and other objects, in the present invention, in a discharge lamp lighting circuit having a DC-DC converter circuit for converting an input voltage from a DC power source to a required DC voltage, a DC-AC converter circuit disposed down-circuit of the DC-DC converter circuit and having a bridge-type construction using a plurality of switching devices, and a control circuit for performing lighting control of a discharge lamp, a voltage generated from a power supply voltage to the control circuit is supplied as a voltage for driving the DC-AC converter circuit.

Accordingly, with this invention, because a generated voltage based on the power supply voltage to the control circuit is used as the voltage for driving the DC-AC converter circuit, it becomes unnecessary to generate the required voltage by raising or lowering directly the input voltage from the DC power source.

DETAILED DESCRIPTION OF THE PREFERRED EMBODIMENTS

Figure 1:
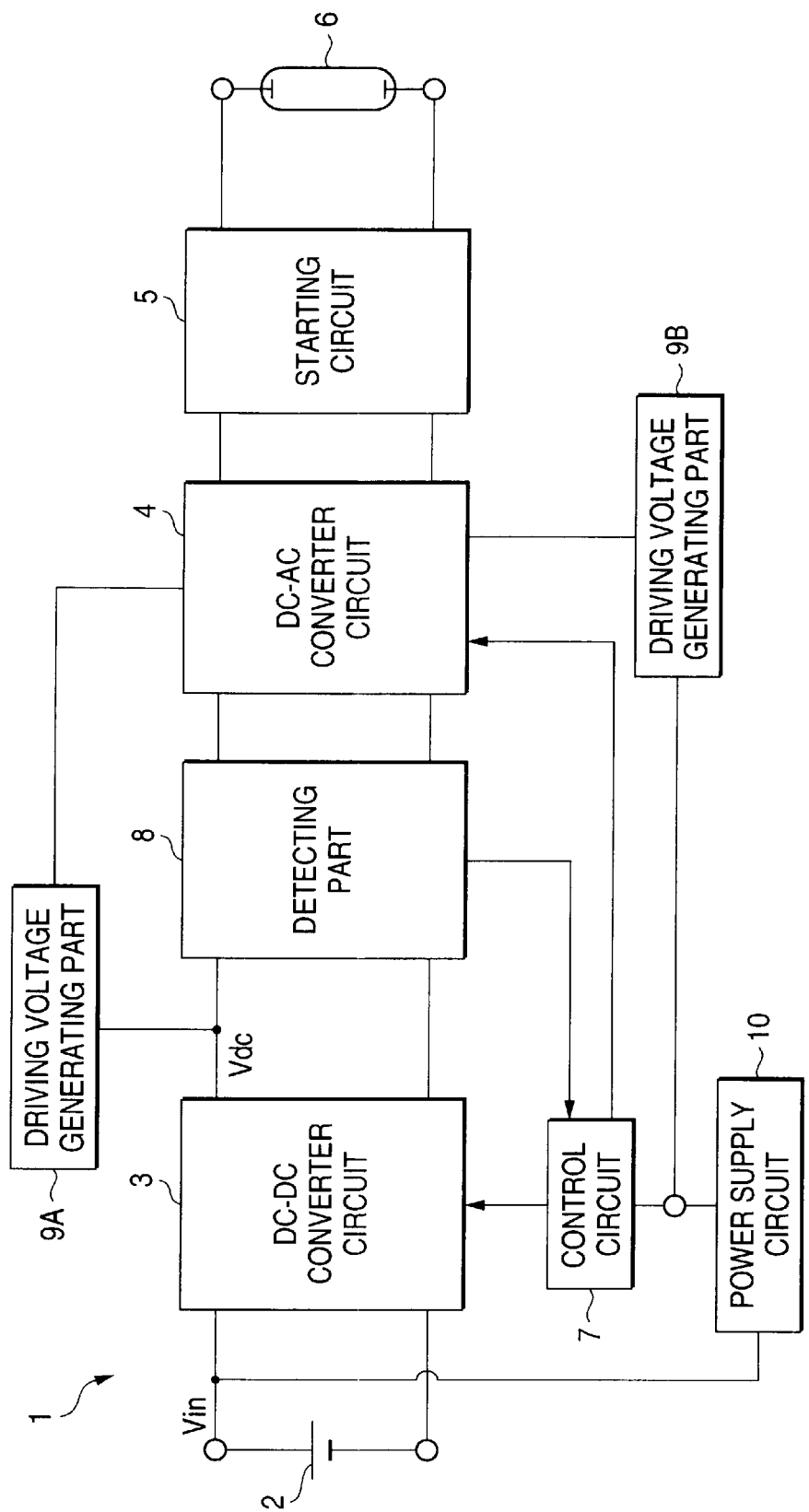
FIG. 1 is a circuit block diagram showing an example of the basic construction of a discharge lamp lighting circuit according to the invention.

FIG. 1 shows the basic construction of a discharge lamp lighting circuit according to the invention. This discharge lamp lighting circuit 1 has a DC power source 2, a DC-DC converter circuit 3, a DC-AC converter circuit 4, a starting circuit 5 and a control circuit 7.

The DC-DC converter circuit 3 receives a DC input voltage (which will be written Vin) from the DC power source 2 and converts this into a required DC voltage, and for example consists of a flyback-type DC-DC converter.

The DC-AC converter circuit 4 is provided to convert the output voltage of the DC-DC converter circuit 3 into an AC voltage and supply this via the starting circuit 5 to a discharge lamp 6. For example it has a full bridge circuit using four semiconductor devices and a circuit for driving this bridge circuit, and outputs an AC voltage by ON/OFF-controlling two pairs of switching devices reciprocally.

The starting circuit (so-called starter) 5 is provided to generate a high-voltage pulse signal (starting pulse) for starting the discharge lamp 6 and apply this to the discharge lamp 6, and this signal is superposed on the AC voltage outputted by the DC-AC converter circuit 4 before-being impressed-on the discharge lamp 6.

The control circuit 7 is for receiving a detection signal of the voltage across the discharge lamp and the current flowing through the discharge lamp or of a corresponding voltage and current and controlling the power supplied to the discharge lamp 6 and controlling the output of the DC-DC converter circuit 3. That is, the control circuit 7 is provided to control the power supplied to the discharge lamp 6 in accordance with the state of the discharge lamp 6, and for example it receives a detection signal from a detecting part 8 for detecting the output voltage and the output current of the DC-DC converter circuit 3 and sends to the DC-DC converter circuit 3 a control signal which controls its output voltage. It also controls the DC-AC converter circuit 4 by sending it a control signal. It is also a role of the control circuit 7 to perform output control for ensuring the lighting of the discharge lamp by raising the voltage supplied to the discharge lamp to a certain level before it lights. Known power control methods such as PWM (Pulse Width Modulation) and PFM (Pulse Frequency Modulation) can be used.

For the generation of the voltage for driving the DC-AC converter circuit 4, for example either of the following constructions may be used (in FIG. 1, both constructions are illustrated).

(I) A construction wherein the necessary voltage is generated from the output voltage of the DC-DC converter circuit.

(II) A construction wherein the necessary voltage is generated on the basis of the voltage of the power supply to the control circuit.

In (I), with the premise that the power supplies to the control circuit 7 and the DC-AC converter circuit 4 are separate, the output voltage of the DC-DC converter circuit 3 (shown 'Vdc' in the figure) is stabilized by a driving voltage generating part 9A, and this voltage is supplied as a driving voltage of the switching devices of the DC-AC converter circuit 4. For example, a voltage obtained by clamping and smoothing the output voltage of the DC-DC converter circuit 3 can be used.

In (II), with the object of partially making common the power supplies to the control circuit 7 and the DC-AC converter circuit 4, a predetermined voltage is generated from the power supply of the control circuit 7 by a driving voltage generating part 9B and supplied as a driving voltage of the switching devices of the DC-AC converter circuit 4. For example, a voltage-multiplying circuit for generating from the power supply voltage to the control circuit 7 a voltage an integer (two or greater) multiple thereof can be provided. In the construction shown in the figure, a power supply circuit 10 receives an input voltage from the DC power source 2 and generates from this a power supply voltage to the control circuit and a voltage necessary for driving the DC-AC converter circuit 4 is supplied thereto from the power supply circuit 10 via the driving voltage generating part 9B. It is also possible to design and provide separately from the power supply circuit 10 a dedicated power supply circuit for generating this driving voltage, but when this is done it leads to an increased number of parts and increased cost, and rather it is preferable for main parts of a power supply circuit to be used commonly to reduce their number as far as possible.

Figure 2:
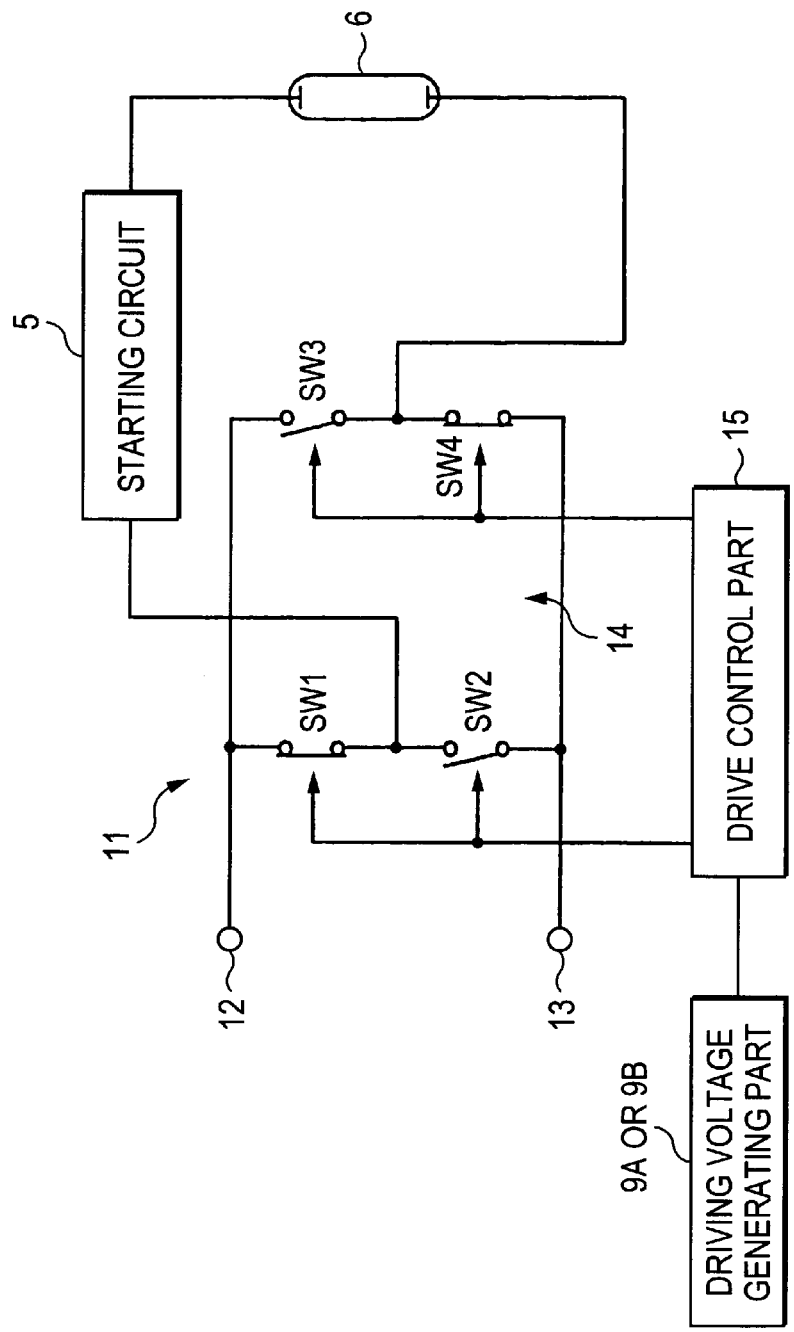
FIG. 2 is a view illustrating an example construction of a DC-AC converter circuit.

FIG. 2 shows in outline an example construction 11 of the DC-AC converter circuit 4. This is a full bridge construction using four semiconductor switching devices SW1 through SW4 (in the figure they are simply shown with switch symbols, but field effect transistors or the like are used).

The terminals 12, 13 shown in the figure are terminals for connection to the DC-DC converter circuit 3; the terminal 12 is connected to the switching devices SW1 and SW3, and the terminal 13 is connected to the switching devices SW2 and SW4.

Of the switching devices constituting the bridge 14, the devices SW1 and SW2 connected in series and the devices SW3 and SW4 connected in series are respectively connected in parallel between the terminals 12 and 13, and the ON/OFF states of the switching devices are regulated by control signals supplied to control terminals (in FETs, gates) of the devices from a drive control part 15. That is, with SW1 and SW4 as a pair and SW2 and SW3 as a pair, an AC output is obtained by these pairs being switch-controlled reciprocally (an output obtained from the point of connection between SW1 and SW2 and the point of connection between SW3 and SW4 is supplied to the discharge lamp).

The drive control part 15 may for example have a construction using two half bridge driver ICs for driving the switching devices or a circuit construction for driving each switching device separately; in either case it needs to receive a voltage supply for driving the switching devices, and, as described above, it is sent the necessary voltage from a driving voltage generating part 9A or 9B.

Here, as mentioned above, it is necessary to consider fluctuation of the DC power source voltage. For example, in form (I) above, the circuit is so constructed that the necessary voltage value is obtained as the driving voltage to the drive control part 15 even when the input voltage from the DC power source 2 has fallen, and in form (II) above, for example the value of the power supply voltage to the control circuit 7 is below the value of the input voltage Vin from the DC power source 2 (for example 5V, with respect to Vin=12V), and the multiplying factor of the voltage-multiplying circuit is set so that the necessary value is obtained as the driving voltage of the drive control part 15 even when that input voltage as fallen.

Figure 3:
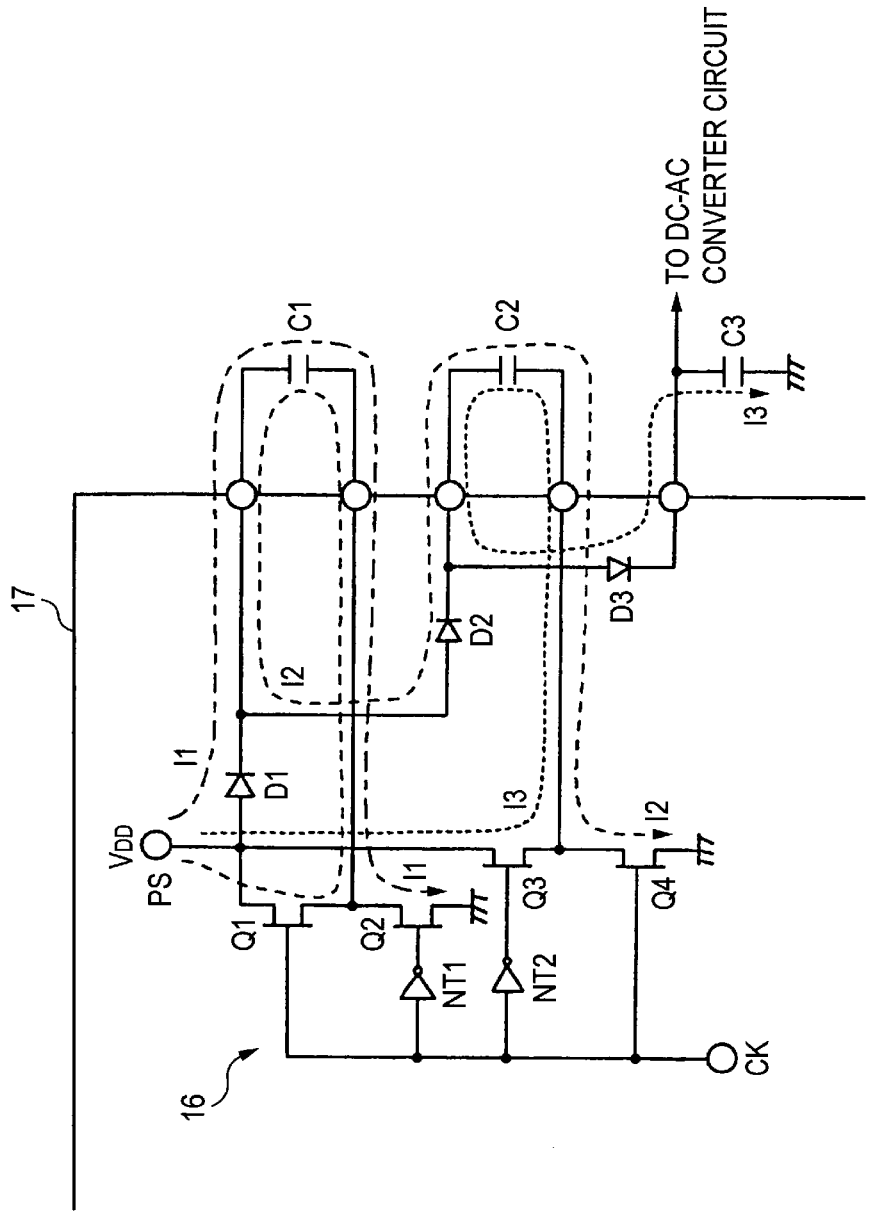
FIG. 3 is a circuit diagram showing an example construction of a driving voltage generating part using a voltage-tripling circuit.
Figure 4:
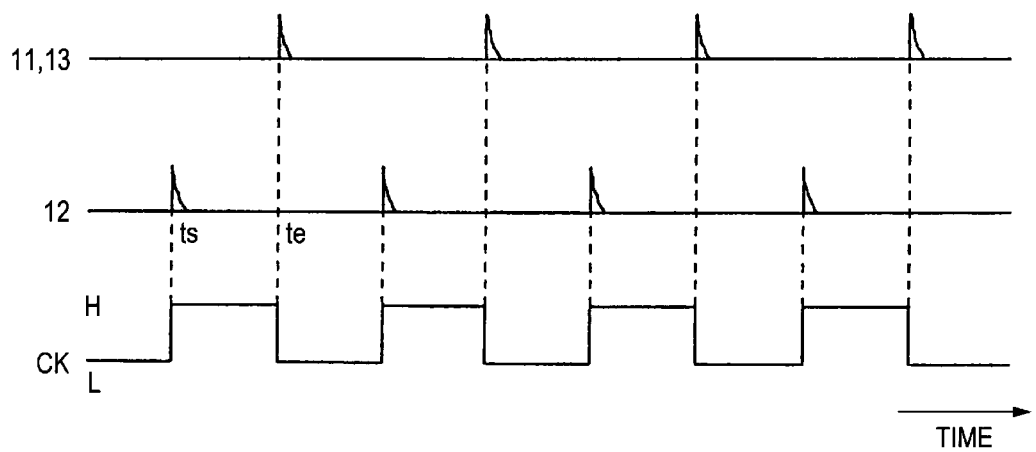
FIG. 4 is a waveform chart illustrating the operation of the circuit shown in FIG. 3.
Figure 5:
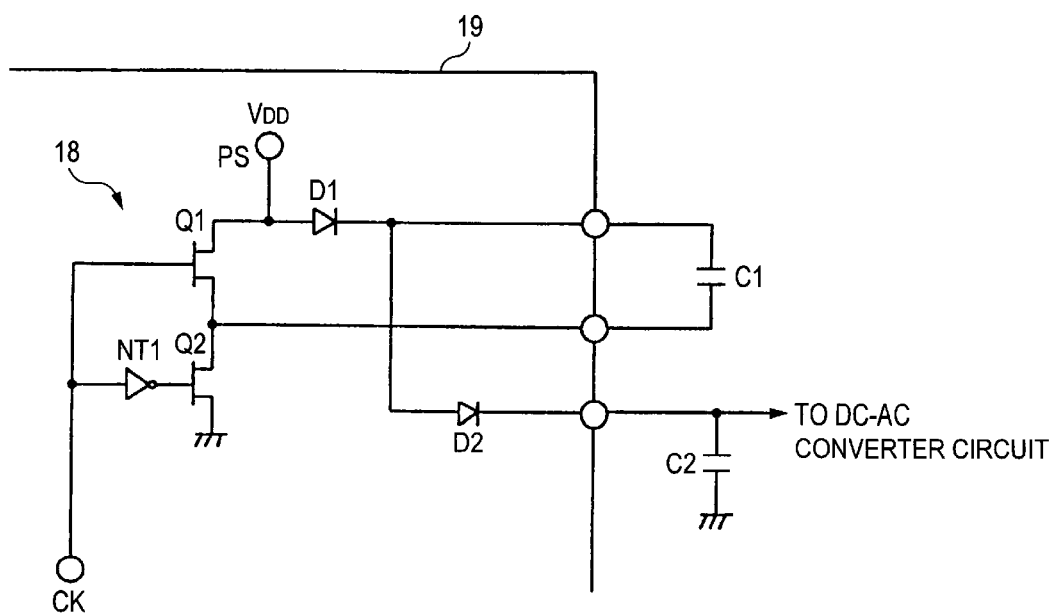
FIG. 5 is a circuit diagram showing an example construction of a driving voltage generating part using a voltage-doubling circuit.

FIG. 3 through FIG. 5 show an example construction of form (II) above: FIG. 3 and FIG. 4 show a construction example in which a voltage-tripling circuit is used, and FIG. 5 shows a construction example in which a voltage-doubling circuit is used.

Generally the control circuit 7 is made an integrated circuit, to reduce the size of the device, and in this case it has its own predetermined voltage as a power supply voltage or a reference voltage. And for example when it has a voltage of about 5V, by providing a circuit for tripling this, ideally a voltage of about 15V can be obtained, and when it has a voltage of about 8V, by providing a circuit for doubling this, ideally a voltage of about 16V can be obtained. Consequently, it is possible to secure an ample value as the voltage necessary for the drive control part 15.

FIG. 3 shows a circuit construction example 16 for a case where VDD=5V. Here, circuit components other than capacitors C1, C2 and C3 are integrated and formed inside a control IC 17 (that is, the capacitors C1 through C3 are made peripheral components of the control IC 17).

A clock signal 'CK' from a signal-generating part (not shown) is supplied to the control terminals of switch devices Q1 through Q4 (although transistors such as FETs are used, they are shown with simple symbols in the figure) to regulate their ON/OFF states. That is, the switch devices Q1 and Q2 are connected in series and Q1, which is on a high stage side, is connected to a VDD power supply terminal PS and to one terminal (a non-control terminal) of Q2, which is on a low stage side. The control terminal of Q1 is directly supplied with the clock signal CK, and the control terminal of Q2 is supplied with the clock signal CK by way of a NOT (logical negative) gate 'NT1'.

The switch devices Q3 and Q4 are connected in series, and Q3, which is on the high stage side, is connected to the VDD power supply terminal PS and to one terminal (a non-control terminal) of Q4, which is on the low stage side. The control terminal of Q3 is supplied with the clock signal CK by way of a NOT (logical negative) gate 'NT2', and the control terminal of Q4 is supplied with the clock signal CK by directly.

The capacitors C1, C2 and C3 have equal capacitances and are each connected to connection terminals of the control IC 17.

The capacitor C1 has one side connected to the power supply terminal PS by way of a diode D1 (one terminal of the capacitor C1 is connected to the cathode of the diode D1, and the anode of the diode D1 is connected to the power supply terminal PS), and the other side of the capacitor C1 is connected to the connection point between the switch devices Q1 and Q2.

The capacitor C2 has one side connected to the diode D1 by way of a diode D2 (one terminal of the capacitor C2 is connected to the cathode of the diode D2, and the anode of the diode D2 is connected to the cathode of the diode D1), and the other side of the capacitor C2 is connected to the connection point between the switch devices Q3 and Q4.

The capacitor C3 has one side connected to the cathode of a diode D3 and the other side grounded, and the anode of the diode D3 is connected to the cathode of the diode D2.

FIG. 4 shows the waveforms of the different parts, and the meanings of the symbols in this figure are as-follows:

"I1"=the current flowing from the VDD terminal PS through the diode D1 to the switch device Q2, charging the capacitor C1

"I2"=the current flowing from the VDD terminal PS via the switch device Q1 through C1 and D2 to the switch device Q4, charging the capacitor C2

"I3"=the current flowing from the VDD terminal PS via the switch device Q3 through C2 and D3, charging the capacitor C3

"ts"=the start point of the rise of CK

"te"=the start point of the fall of CK

"CK" is the clock signal (rectangular wave signal) mentioned above, and in the figure 'I1' and 'I3' are shown by the same line. The respective routes of I1 through I3 are shown in FIG. 3.

When the clock signal CK rises to its H (high) level, the switch devices Q1 and Q4 become ON, and consequently a current I2 flows as a charge transfer path (in FIG. 4, I2 rises at the time ts). That is, a charge is transferred from C1 to C2.

When the clock signal CK falls to the L (low) level, the switch devices Q2 and Q3 become ON, and currents I1 and I3 flow (in FIG. 4, I1 and I3 rise at the time te). That is, charging of C1 and charge transfer from C2 to C3 are carried out.

As a result of this cycle being repeated in accordance with the clock signal CK, tripling of the VDD is carried out, and consequently at the capacitor C3 '3.VDD−3.Vf≈13V' (Vf being the forward voltage drop) is obtained, and this voltage is sent out to the DC-AC converter circuit 4.

FIG. 5 shows a circuit construction example 18, for a case where VDD=8V. Here, a voltage-doubling construction is used.

Because the construction shown in this example is simpler than the construction of the voltage-tripling circuit shown in FIG. 3 (Q3, Q4, NT2, D3 and C3 are not present), itemizing just the differences gives the following:

The capacitors C1 and C2 have been made peripheral components of a control IC 19.

Only switch devices Q1 and Q2 are provided.

The anode of the diode D1 is connected to the power supply terminal PS, its cathode is connected to one side of the capacitor C1, and the other side of the capacitor C1 is connected to the connection point between the switch devices Q1 and Q2.

The anode of the diode D2 is connected to the cathode of D1, the cathode of D2 is connected to one side of the capacitor C2 (the other side of the capacitor C2 is grounded), and a voltage is sent from this capacitor C2 to the DC-AC converter circuit 4.

Accordingly, in this circuit, when the clock signal CK rises to the H level, because the switch device Q1 becomes ON, charge transfer from C1 to C2 is carried out, and when the clock signal CK falls to the L level, the switch device Q2 becomes ON and charging of C1 is carried out. As a result of this cycle repeating in accordance with the clock signal CK, voltage doubling is carried out with respect to the VDD, '2.VDD−2.Vf≈14.5V' is obtained at the capacitor C2, and this voltage is sent to the DC-AC converter circuit 4.

When as the form of construction of the driving voltage generating part a voltage-multiplying circuit having a multiplication factor of two or more (n-times voltage-multiplying circuit with n≧2) of the kind shown in FIG. 3 through FIG. 5 is used, all components except the two or three capacitors can be incorporated into a control IC, and consequently this form is advantageous from the cost point of view. And because in relation to the driving voltage of the DC-AC converter circuit only a current corresponding to the power needed to drive the bridge is consumed, wasteful power loss can be reduced to the minimum.

By applying the construction described above for example to a discharge lamp lighting circuit of a light for use in an automotive vehicle or the like, it is possible to achieve reductions in the size and the cost of the device.

As is clear from the above description, with this invention, by generating a voltage needed for driving a DC-AC converter circuit on the basis of a power supply voltage to a control circuit, it becomes unnecessary to generate the required voltage by raising and lowering an input voltage from a DC power source directly, and it becomes possible to simplify the circuit construction. As a result, reductions in component numbers and cost, and hence reductions in the size and the power consumption of the device can be achieved.

And by using a voltage-multiplying circuit to obtain the driving voltage, power losses can be suppressed.

What is claimed is:

1. A discharge lamp lighting circuit comprising:
   a DC-DC converter circuit for converting an input voltage from a DC power source to a required DC voltage;
   a DC-AC converter circuit disposed down-circuit of the DC-DC converter circuit and having a bridge-type construction using a plurality of switching devices; and
   a control circuit for controlling lighting of a discharge lamp,
   wherein a voltage generated from a power supply voltage to the control circuit is supplied as a voltage for driving the DC-AC converter circuit.

2. A discharge lamp lighting circuit according to claim 1, further comprising a voltage-multiplying circuit for generating from the power supply voltage to the control circuit a voltage an integer (at least two) multiple of the power supply voltage to the control circuit,
   wherein the voltage obtained by the voltage-multiplying circuit is supplied as the voltage for driving the DC-AC converter circuit.

3. A discharge lamp lighting circuit according to claim 2, wherein the value of the power supply voltage to the control circuit is below the value of the input voltage from the DC power source and the multiplying factor of the voltage-multiplying circuit is set so that a voltage value necessary for driving the DC-AC converter circuit is obtained even when the input voltage has fallen.

4. A discharge lamp lighting circuit according to claim 1 further comprising a power supply circuit for generating a voltage to supply to the control circuit and to the DC-AC converter circuit.

* * * * *